(12) United States Patent
Owa

(10) Patent No.: US 12,222,335 B2
(45) Date of Patent: Feb. 11, 2025

(54) PREPARATIVE CHROMATOGRAPH SYSTEM

(71) Applicant: SHIMADZU CORPORATION, Kyoto (JP)

(72) Inventor: Michiaki Owa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 457 days.

(21) Appl. No.: 17/433,261

(22) PCT Filed: Mar. 6, 2019

(86) PCT No.: PCT/JP2019/008803
§ 371 (c)(1),
(2) Date: Aug. 24, 2021

(87) PCT Pub. No.: WO2020/179003
PCT Pub. Date: Sep. 10, 2020

(65) Prior Publication Data
US 2022/0137007 A1 May 5, 2022

(51) Int. Cl.
*G01N 30/20* (2006.01)
*G01N 30/06* (2006.01)

(52) U.S. Cl.
CPC ............. *G01N 30/20* (2013.01); *G01N 30/06* (2013.01); *G01N 2030/204* (2013.01)

(58) Field of Classification Search
CPC ................................ G01N 30/06; G01N 30/20
See application file for complete search history.

(56) References Cited

U.S. PATENT DOCUMENTS

| 4,859,342 A | * | 8/1989 | Shirasawa ............ B01D 15/203 |
| | | | 210/659 |
| 2003/0113936 A1 | * | 6/2003 | Yamamoto ......... G01N 30/8624 |
| | | | 73/61.52 |

(Continued)

FOREIGN PATENT DOCUMENTS

| CN | 1627067 A | 6/2005 |
| JP | 59-092853 | 6/1984 |

(Continued)

OTHER PUBLICATIONS

Decision of Refusal for corresponding JP Application No. 2021-503327, dated Oct. 25, 2022, with English language machine translation.

(Continued)

*Primary Examiner* — Jamel E Williams
*Assistant Examiner* — Alex T Devito
(74) *Attorney, Agent, or Firm* — Renner, Otto, Boisselle & Sklar, LLP

(57) ABSTRACT

A preparative chromatograph system includes a sample injector that injects a sample into a separation flow path (8) through which a mobile phase flows, a separation column that is provided on the separation flow path and is to separate a sample injected into the separation flow path into components, a detector that is provided at a position farther downstream than the separation column on the separation flow path and is to detect sample components obtained by separation in the separation column, a collector having a plurality of collection containers for collecting part of an eluate eluted from the separation column and a switch mechanism configured to be capable of selectively connecting a downstream end of the separation flow path to any one of the collection containers, a collection setter configured to set a portion, to be collected in each of the collection containers, of an eluate eluted from the separation column (Continued)

using a pre-acquired chromatogram of a sample, and a collection setter configured to be capable of setting a portion, including a sample component, of an eluate eluted from the separation column, and a portion, between two sample components that are adjacent to each other on the chromatogram, of an eluate eluted from the separation column, as the portion to be collected, and a controller configured to control an operation of the switch mechanism of the collector and collect the portion, which is to be collected and is set by the connection setter, in the predetermined collection container.

3 Claims, 4 Drawing Sheets

(56) References Cited

U.S. PATENT DOCUMENTS

| | | | |
|---|---|---|---|
| 2005/0121392 A1 | 6/2005 | Hoffman | |
| 2018/0136174 A1 | 5/2018 | Nagai | |

FOREIGN PATENT DOCUMENTS

| | | | |
|---|---|---|---|
| JP | 61-061462 | | 4/1986 |
| JP | 04-138357 A | | 5/1992 |
| JP | 04-138357 | | 12/1992 |
| JP | 2005512029 | * | 4/2005 |
| JP | 2005-331436 A | | 12/2005 |
| JP | 2010-014559 A | | 1/2010 |
| WO | 2016/194108 A1 | | 12/2016 |

OTHER PUBLICATIONS

International Search Report for corresponding Application No. PCT/JP2019/008803, mailed May 28, 2019.
Written Opinion for corresponding Application No. PCT/JP2019/008803, mailed May 28, 2019 (machine English translation).
Office Action for corresponding Chinese Patent Application No. 201980092799.2 dated Jun. 15, 2023, with English language machine translation.
Extended European Search Report for corresponding European Patent Application No. 19917772.6, issued Aug. 18, 2022.
Notice of Reasons for Refusal for corresponding Japanese Patent Application No. 2021-503327, dated Jun. 7, 2022, with English language machine translation.
Office Action for corresponding Chinese Patent Application No. 201980092799.2 dated Jan. 4, 2024, with English language machine translation.

* cited by examiner

F I G. 4
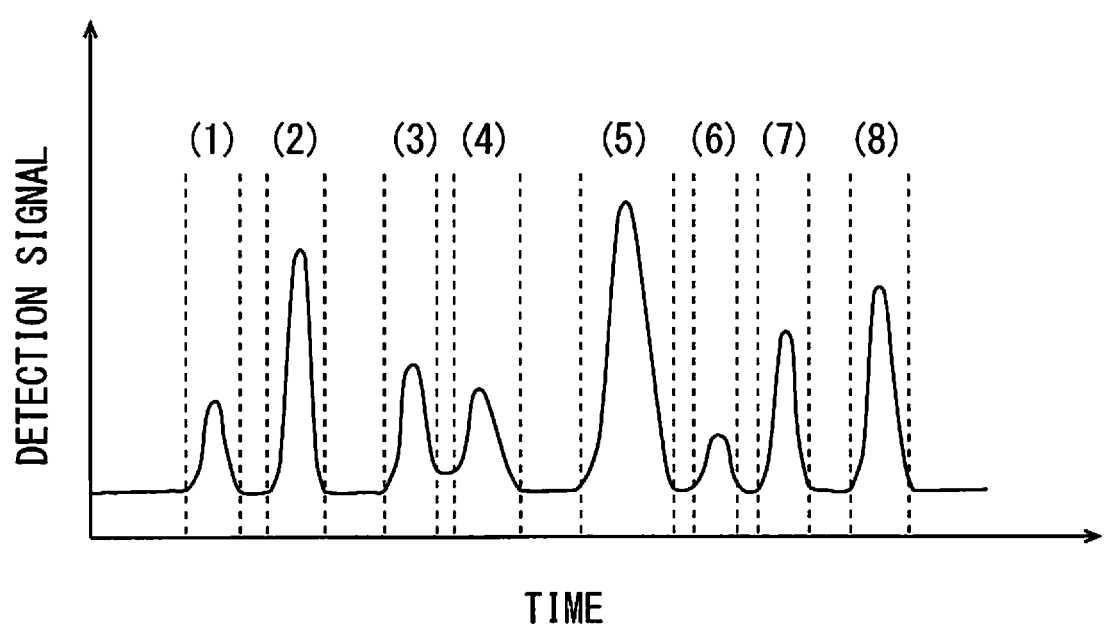

PREPARATIVE CHROMATOGRAPH SYSTEM

TECHNICAL FIELD

The present invention relates to a preparative chromatograph system that separates a sample into components by utilizing a liquid chromatograph (LC) or a supercritical fluid chromatograph (SFC), and fractionates and collects sample components obtained by separation.

BACKGROUND ART

A preparative chromatograph system that separates a sample into components by utilizing a liquid chromatograph (LC) or a supercritical fluid chromatograph (SFC), and fractionates and collects the sample components obtained by separation has been known (see Patent Document 1). With such a preparative chromatograph system, only a portion, including a target component, of an eluate eluted from a separation column is collected in a collection container, and rest of the portion is to be discarded to a drain.

CITATION LIST

Patent Document

[Patent Document 1] WO 2016/194108 A1

SUMMARY OF INVENTION

Technical Problem

Among components in a sample, portions that are not completely separated in an LC or an SFC and have peaks that overlap with one another on a chromatogram are also present. With a conventional preparative chromatograph system, when a separation condition with which such two peak components are separated as individual peak components is set, an eluate portion that is present between these two peak components is to be discarded to the drain.

However, in a case where a separation amount of one or both of two peak components is not sufficient, because the eluate portion between these two peaks has been discarded, the eluate portion cannot be easily separated again. It is possible to set a separation condition (separation based on time, separation based on a waveform process) such that the eluate portion between the two overlapping peaks is separated. However, it is not easy to set conditions, and it takes time to study.

The present invention was conceived considering the above-mentioned problems, and an object of the present invention is to provide a preparative chromatograph system having the configuration that enables re-separation of sample components.

Solution to Problem

A preparative chromatograph system according to the present invention includes a sample injector that injects a sample into a separation flow path through which a mobile phase flows, a separation column that is provided on the separation flow path and is to separate a sample injected into the separation flow path into components, a detector that is provided at a position farther downstream than the separation column on the separation flow path and is to detect sample components obtained by separation in the separation column, a collector having a plurality of collection containers for collecting part of an eluate eluted from the separation column and a switch mechanism configured to be capable of selectively connecting a downstream end of the separation flow path to any one of the collection containers, a collection setter configured to set a portion, to be collected in each of the collection containers, of an eluate eluted from the separation column using a pre-acquired chromatogram of a sample, and a collection setter configured to be capable of setting a portion, including a sample component, of an eluate eluted from the separation column, and a portion, between two sample components that are adjacent to each other on the chromatogram, of an eluate eluted from the separation column, as the portion to be collected, and a controller configured to control an operation of the switch mechanism of the collector and collect the portion, which is to be collected and is set by the connection setter, in the predetermined collection container.

Advantageous Effects of Invention

The preparative chromatograph system according to the present invention is configured such that not only a portion, including a sample component, of an eluate eluted from a separation column but also the portion, between two sample components that are adjacent to each other on a chromatogram, of an eluate eluted from the separation column can be set as portions to be collected. Therefore, the portion between two sample components that used to be discarded from the drain with the conventional preparative chromatograph system can be fractionated to be collected. Thus, even in a case where one or both of separation amounts of sample components that are adjacent to each other on a chromatogram are not sufficient, sample components can be re-separated with the use of the portion between the two sample components.

BRIEF DESCRIPTION OF THE DRAWINGS

FIG. 4 A chromatogram showing one example of collection setting in the same inventive example.

DESCRIPTION OF EMBODIMENTS

Embodiments of a chromatograph preparative system will be described below with reference to the drawings.

Figure 1:
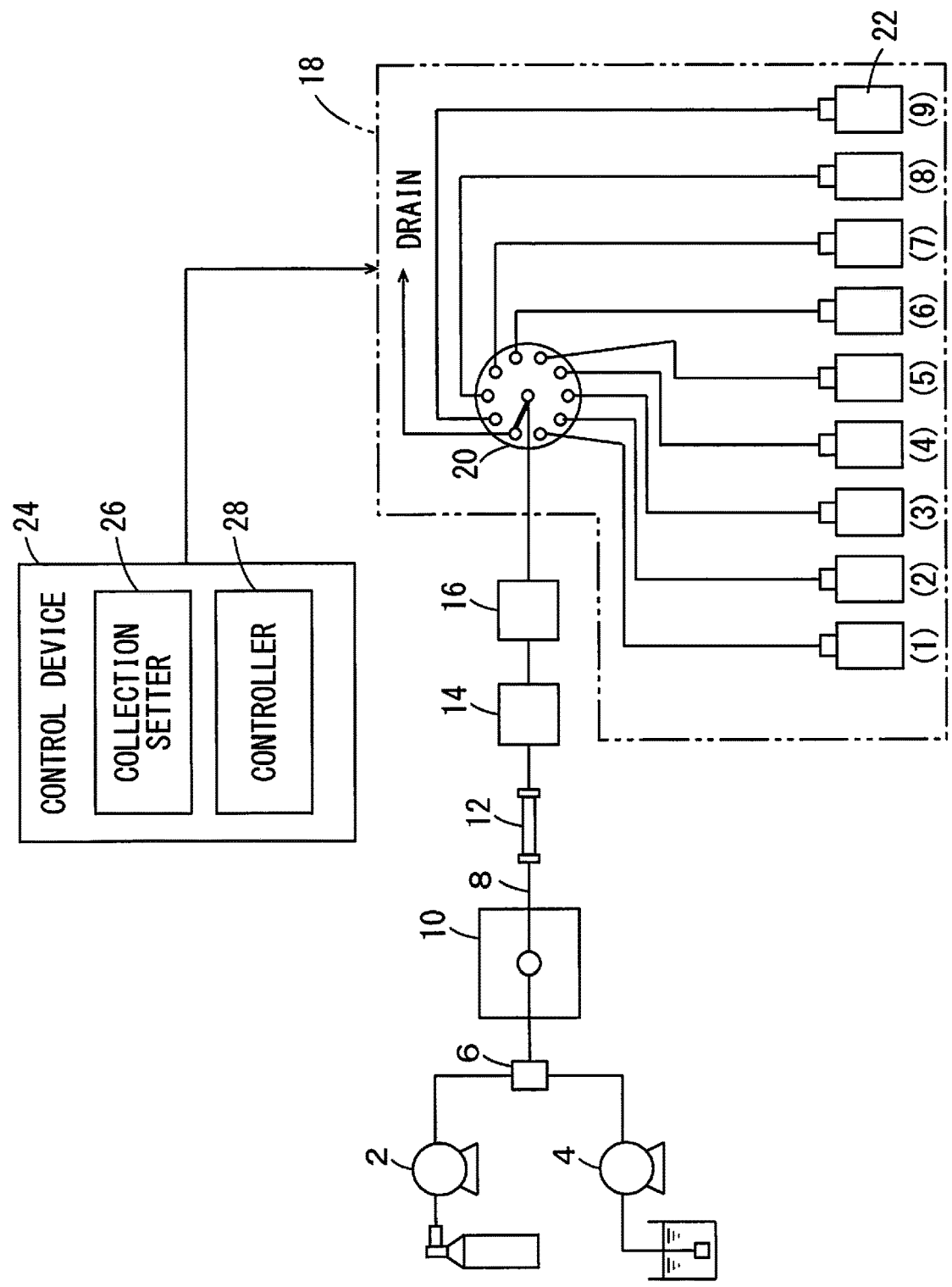
FIG. 1 A diagram showing the schematic configuration of one inventive example of a preparative chromatograph system.

FIG. 1 shows one inventive example of the chromatograph preparative system.

The inventive example is an SFC preparative chromatograph system, and includes a liquid sending pump 2 that sends liquefied carbon dioxide and a liquid sending pump 4 that sends a modifier such as ethanol. Liquefied carbon dioxide and a modifier are mixed in a mixer 6 and then flow through a separation flow path 8 as a mobile phase. A sample injector 10, a separation column 12, a detector 14 and a back pressure regulator 16 are provided on the separation flow path 8, and a collector 18 is provided at the downstream end of the separation flow path 8.

The sample injector 10 is to inject a sample into the separation flow path 8. The separation column 12 is provided at a position farther downstream than the sample injector 10 on the separation flow path 8 and is to separate a sample that has been injected into the separation flow path 8 by the sample injector 10 into components. The detector 14 is provided at a position farther downward than the separation column 12 on the separation flow path 8 and is to detect sample components obtained by separation in the separation column 12. The back pressure regulator 16 is provided at a position farther downward than the detector 14 on the separation flow path 8 and is to adjust the pressure in a portion of the separation flow path 8 located at a position farther upstream than the back pressure regulator 16 to a predetermined pressure. At least the pressure in the separation column 12 is maintained by the back pressure regulator 16 at a pressure (equal to or larger than 10 MPa) at which carbon dioxide in the mobile phase is in a supercritical state.

The collector 18 includes a switch valve 20 (switch mechanism) and a plurality of collection containers 22. The switch valve 20 is a multi-port valve including a common port and a plurality of selection ports, and causes the common port and any one of the selection ports to be in fluid connection with each other. The downstream end of the separation flow path 8 is connected to the common port of the switch valve 20, and the collection containers 22 (1) to 22 (9) are respectively connected to selection ports of the switch valve 20. One selection port of the switch valve 20 is connected to a drain.

The operation of the collector 18 is controlled by a control device 24. The control device 24 is realized by a dedicated computer or a general personal computer. The control device 24 includes a collection setter 26 and a controller 28. The collection setter 26 and the controller 28 are functions obtained by execution of a program by the Central Processing Unit (CPU) in the control device 24.

Figure 2:
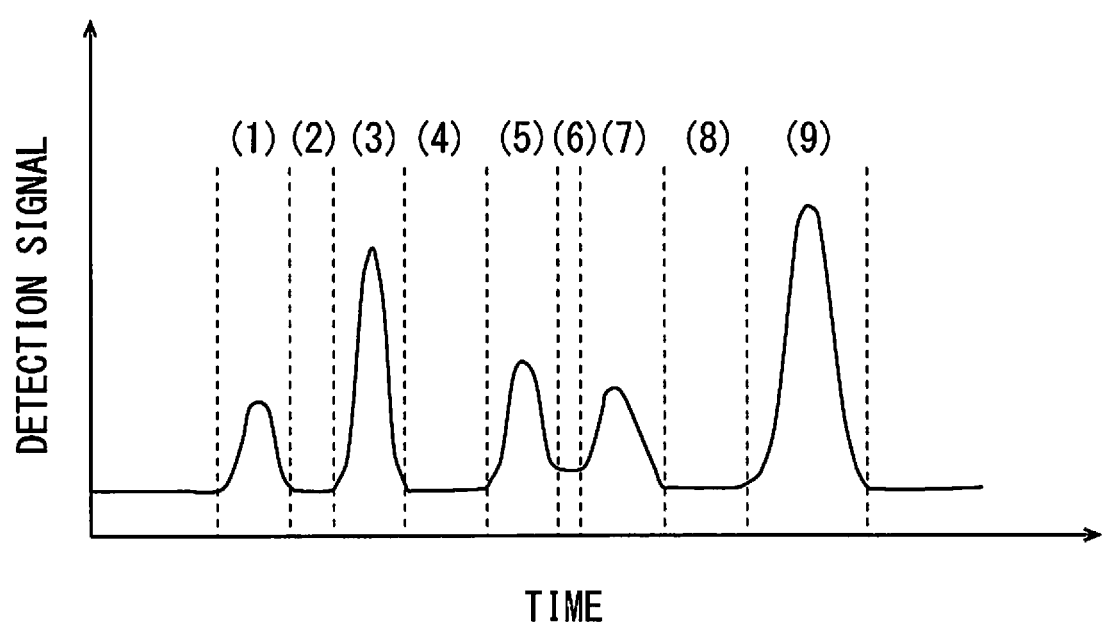
FIG. 2 A chromatogram showing one example of collection setting in the same inventive example.

On a chromatogram acquired in advance in regard to a sample, the collection setter 26 is configured to set a portion, to be collected in each collection container 22, of an eluate eluted from the separation column 12. As shown in FIG. 2, the collection setter 26 is configured to be capable of setting not only a portion including a peak of a sample component obtained by separation in the separation column 12 but also the portion between two adjacent peaks of sample components, as an eluate portion to be collected in each of the collection containers 22 (1) to 22 (9). FIG. 2 is an example in which sample components that are eluted from the separation column 12 are collected in the collection containers 22 (1) to 22 (9) in the order of elution. In this setting, portions including sample components are collected in the collection containers 22 (1), 22 (3), 22 (5), 22 (7) and 22 (9), and the portions between two adjacent peaks of sample components are collected in the collection containers 22 (2), 22 (4), 22 (6) and 22 (8). In regard to the selection ports of the switch valve 20, a selection port to which the collection container 22 (1) that collects a peak of a sample component (1) is connected, a selection port to which the collection container 22 (2) that collects the portion between the peak of the sample component (1) and the peak of the sample component (2) is connected, a selection port to which the collection container 22 (3) that collects a sample component (3) is connected, a selection port to which the collection container 22 (4) that collects the portion between the peak of the sample component (3) and the peak of the sample component (5) is connected and so on are arranged in this order to be adjacent to one another. Therefore, when components (1) to (9) are respectively collected in the collection containers 22 in order, a selection port of the switch valve 20 may only be switched to a selection port one next to the selection port.

The collection setter 26 may be configured to automatically perform the above-mentioned setting based on the relationship between the number of peaks of sample components that appear on a chromatogram and the number of collection containers 22. For example, in a case where the number of peaks of sample components that appear on a chromatogram is equal to or smaller than half of the number of the collection containers 22, eluate portions to be collected automatically and the collection containers 22 that collect these eluate portions may be set such that all of the portions including peaks of sample components and the portions between two adjacent peaks of sample components are collected in the collection containers 22.

Further, the collection setter 26 may be configured to set which eluate portion is to be collected in which collection container 22 by causing a user to designate an eluate portion to be collected in a collection container 22 and the collection container 22 that collects the eluate portion.

The controller 28 is configured to collect portions, that are to be collected and are set by the collection setter 26, in the respective collection containers 22 by switching the switch valve 20 based on signals of the detector 14 or by switching the switch valve 20 at preset points in time. In a case where setting is made as shown in FIG. 2, the controller 28 connects the downstream end of the separation flow path 8 to the drain until an eluate portion including a sample component that is eluted first from the separation column 12 arrives at the switch valve 20, and then collects respective eluate portions in the collection containers 22 (1) to 22 (9) by switching the switch valve 20 counterclockwise.

In a case where the number of peaks of sample components that appear on a chromatogram is larger than half of the number of the collection containers 22, in order to collect all of portions including peaks of sample components in the collection containers 22, it is not possible to collect all of eluate portions between two adjacent peaks of sample components in the collection containers 22. In such a case, it is necessary to switch the switch valve 20 such that portions not to be collected in the collection containers 22 are discharged to the drain. Thus, it is necessary to make a major switch of the switch valve 20.

Figure 3:
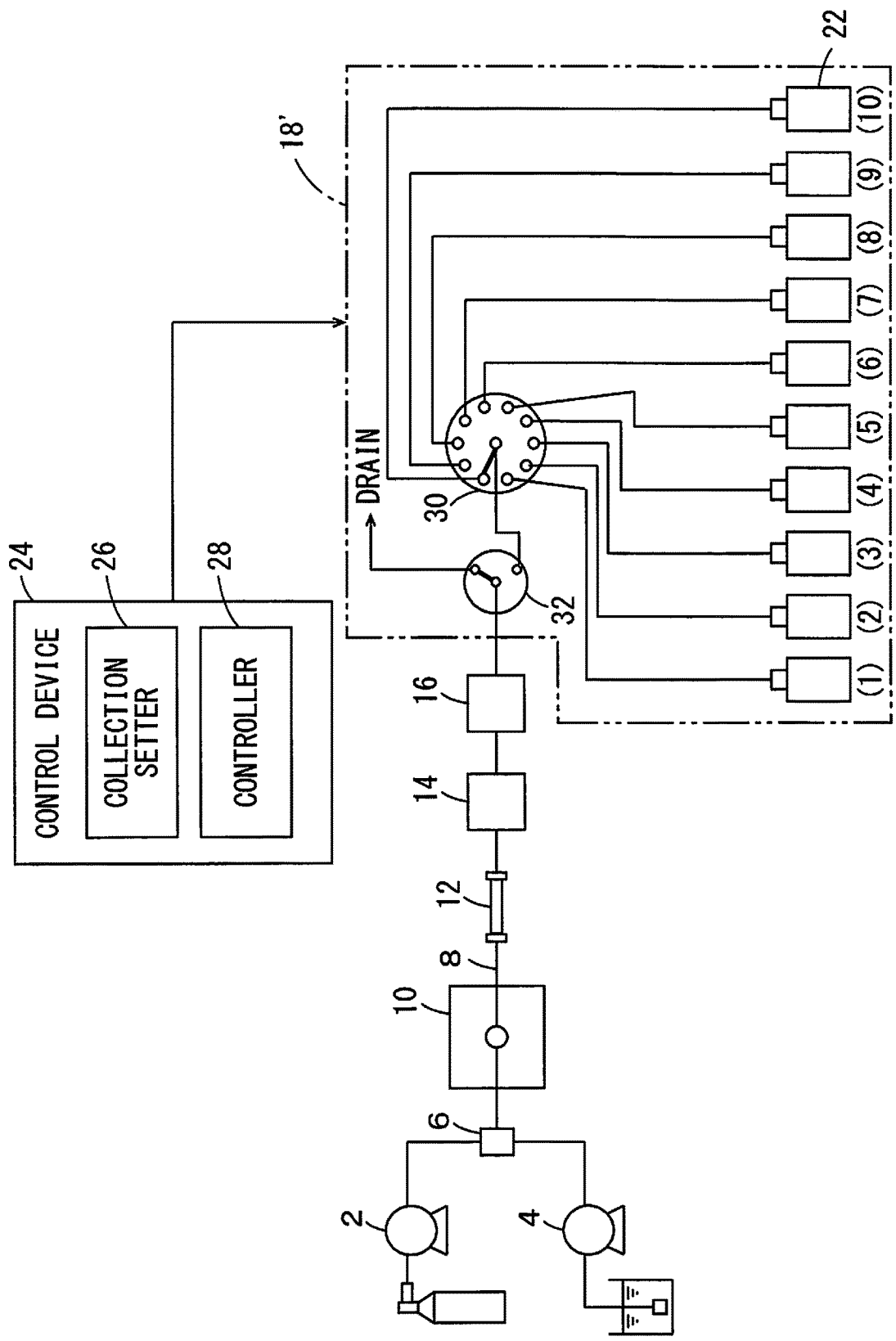
FIG. 3 A diagram showing the schematic configuration of another inventive example of a preparative chromatograph system.

As such, as shown in FIG. 3, a switch valve 32 (second switch valve) for switching the object to which the downstream end of the separation flow path 8 is connected between a switch valve 30 (first switch valve) and the drain can be provided at a position farther upstream than the switch valve 30 for switching the collection containers 22 to be connected to the downstream end of the separation flow path 8. In a case where a collector 18' has such a configuration, the collection containers 22 can be connected to all of the selection ports of the switch valve 30, and the number of eluate portions to be collected in the collection containers 22 can be increased. Further, collection setting can be performed more flexibly. As shown in FIG. 4, in a case where the number of peaks of sample components that appear on a chromatogram is larger than half of the number of the collection containers 22, the collection setter 26 can perform setting such that all of eluate portions including peaks of sample components are collected in order in the respective collection containers 22 (1) to 22 (8).

While the SFC preparative chromatograph system is described, by way of example, in the inventive example described above, the present invention is not limited to this. The present invention can also be similarly applied to an LC preparative chromatograph system. The embodiments of the preparative chromatograph system according to the present invention is as described below.

A preparative chromatograph system according to the present invention includes a sample injector that injects a sample into a separation flow path through which a mobile phase flows, a separation column that is provided on the separation flow path and is to separate a sample injected into the separation flow path into components, a detector that is provided at a position farther downstream than the separation column on the separation flow path and is to detect sample components obtained by separation in the separation column, a collector having a plurality of collection containers for collecting part of an eluate eluted from the separation column and a switch mechanism configured to be capable of selectively connecting a downstream end of the separation flow path to any one of the collection containers, a collection setter configured to set a portion, to be collected in each of the collection containers, of an eluate eluted from the separation column using a pre-acquired chromatogram of a sample, and a collection setter configured to be capable of setting a portion, including a sample component, of an eluate eluted from the separation column, and a portion, between two sample components that are adjacent to each other on the chromatogram, of an eluate eluted from the separation column, as the portion to be collected, and a controller configured to control an operation of the switch mechanism of the collector and collect the portion, which is to be collected and is set by the connection setter, in the predetermined collection container.

In a first aspect of the above-mentioned embodiment, the switch mechanism includes a switch valve for selectively switching the collection container into which an eluate eluted from the separation column is introduced, the switch valve includes a plurality of ports, and the plurality of ports include a port to which a collection container that collects a portion, including a sample component, of an eluate eluted from the separation column is connected, and a port to which a collection container that collects only a portion, between two sample components that are adjacent to each other on the chromatograph, of an eluate eluted from the separation column, is connected.

In a second aspect of the above-mentioned embodiment, the port to which a collection container for collecting a portion, between first and second sample components that are adjacent to each other on the chromatogram, of an eluate eluted from the separation column is connected is provided between the port to which a collection container for collecting the first sample component is connected, and the port to which a collection container for collecting the second sample component is connected, to be continuous to these ports.

In a third aspect of the above-mentioned embodiment, the collection setter is configured to set a portion designated by a user on the chromatogram as the portion to be collected. With such an aspect, degree of flexibility in setting in regard to the condition of fraction collection is improved.

In a fourth aspect of the above-mentioned embodiment, the switch mechanism includes a first switch valve for selectively switching the collection container to which an eluate eluted from the separation column is introduced and a second switch valve for switching a downstream end of the separation flow path to the first switch valve or a drain. With such an aspect, setting in regard to fraction collection can be performed more flexibly. The second aspect can be combined with the above-mentioned first aspect.

REFERENCE SIGNS LIST 2, 4 Liquid sending pumps
6 Mixer
8 Separation flow path
10 Sample injector
12 Separation column
14 Detector
16 Back pressure regulator
18, 18' Collectors
20, 30, 32 Switch valves
22 Collection container
24 Control device
26 Collection setter
28 Controller

The invention claimed is:

1. A preparative chromatograph system comprising:
a sample injector that injects a sample into a separation flow path through which a mobile phase flows;
a separation column that is provided on the separation flow path and is to separate a sample injected into the separation flow path into components;
a detector that is provided at a position farther downstream than the separation column on the separation flow path and is to detect sample components obtained by separation in the separation column;
a collector having a plurality of collection containers for collecting part of an eluate eluted from the separation column and a switch mechanism configured to be capable of selectively connecting a downstream end of the separation flow path to any one of the collection containers;
a collection setter configured to be capable of setting a portion, to be collected in each of the collection containers, of an eluate eluted from the separation column using a pre-acquired chromatogram of a sample, and the collection setter configured to set a portion, including a sample component, of an eluate eluted from the separation column, and a portion, between two sample components that are adjacent to each other on the chromatogram, of an eluate eluted from the separation column, as the portion to be collected; and
a controller configured to control an operation of the switch mechanism of the collector and collect the portion, which is to be collected and is set by the connection setter, in the predetermined collection container,
wherein the switch mechanism includes a switch valve for selectively switching the collection container into which an eluate eluted from the separation column is introduced,
the switch valve includes a plurality of ports,
the plurality of ports include three or more ports to which a collection container that collects a portion, including a sample component, of an eluate eluted from the separation column is connected, and a plurality of ports to which a collection container that collects only a portion, between two sample components that are adjacent to each other on the chromatogram, of an eluate eluted from the separation column, is connected,
the port to which a collection container for collecting a portion, between first and second sample components that are adjacent to each other on the chromatogram, of an eluate eluted from the separation column is connected is provided between the port to which a collection container for collecting the first sample component is connected, and the port to which a collection container for collecting the second sample component is connected, to be continuous to these ports, and the port to which a collection container for collecting a portion, between the second sample component and a third sample component that are adjacent to each other on the chromatogram, of an eluate eluted from the separation column is connected is provided between the port to which a collection container for collecting the second sample component is connected, and the port to which a collection container for collecting the third sample component is connected, to be continuous to these ports.

2. The preparative chromatograph system according to claim 1, wherein
the collection setter is configured to set a portion designated by a user on the chromatogram as the portion to be collected.

3. The preparative chromatograph system according to claim 1, wherein
the switch mechanism includes a first switch valve for selectively switching the collection container to which an eluate eluted from the separation column is introduced and a second switch valve for switching a downstream end of the separation flow path to the first switch valve or a drain.

\* \* \* \* \*